(12) United States Patent
Pawliszyn et al.

(10) Patent No.: US 12,553,800 B2
(45) Date of Patent: Feb. 17, 2026

(54) METHOD AND INSTRUMENT FOR EXTRACTING A COMPONENT FROM A SAMPLE

(71) Applicant: JP Scientific Limited, Waterloo (CA)

(72) Inventors: Janusz Boleslaw Pawliszyn, Waterloo (CA); Runshan Jiang, Waterloo (CA); Wei Zhou, Waterloo (CA)

(73) Assignee: JP SCIENTIFIC LIMITED, Waterloo (CA)

( * ) Notice: Subject to any disclaimer, the term of this patent is extended or adjusted under 35 U.S.C. 154(b) by 464 days.

(21) Appl. No.: 18/112,684

(22) Filed: Feb. 22, 2023

(65) Prior Publication Data
US 2023/0273195 A1    Aug. 31, 2023

Related U.S. Application Data

(60) Provisional application No. 63/314,998, filed on Feb. 28, 2022.

(51) Int. Cl.
*G01N 33/543* (2006.01)
*G01N 1/08* (2006.01)
(Continued)

(52) U.S. Cl.
CPC ......... *G01N 1/08* (2013.01); *G01N 33/54333* (2013.01); *A61B 10/0233* (2013.01);
(Continued)

(58) Field of Classification Search
USPC ...................................................... 73/864.74
See application file for complete search history.

(56) References Cited

U.S. PATENT DOCUMENTS

| 5,691,206 | A  | * | 11/1997 | Pawliszyn | G01N 1/02 73/61.76 |
| 7,232,689 | B2 | * | 6/2007  | Pawliszyn | H01J 49/0431 424/9.34 |
| 7,776,615 | B2 | * | 8/2010  | Yuka | B01D 15/08 422/50 |
| 8,080,407 | B2 | * | 12/2011 | Pawliszyn | A61B 5/150503 435/287.1 |

(Continued)

FOREIGN PATENT DOCUMENTS

CA       2389726 C  *  5/2010   ............... G01N 1/40

OTHER PUBLICATIONS

Kottegoda S., et al., "Demonstration of Low Flow Push-Pull Perfusion," Journal of Neuroscience Methods, 2002, vol. 121, pp. 93-101.
(Continued)

*Primary Examiner* — Walter L Lindsay, Jr.
*Assistant Examiner* — Warren K Fenwick
(74) *Attorney, Agent, or Firm* — Borden Ladner Gervais LLP; David Nauman

(57) ABSTRACT

A micro-syringe for inserting into a sample matrix. The micro-syringe includes a micro-syringe body having an orifice at an insertion end; and a plunger at least partially coated with a solid-phase micro-extraction (SPME) coating. The plunger is longitudinally movable between an internal position and an extended position. When the syringe is inserted into the sample matrix, the extraction phase is shielded from the sample matrix by the micro-syringe body when the plunger is in the internal position, and at least a portion of the extraction phase extends past the orifice and is exposed to the sample matrix when the plunger is in the extended position. The plunger is sized to fit the internal diameter of the micro-syringe body to draw a liquid into the micro-syringe body when the plunger is moved from the extended position to the internal position.

20 Claims, 4 Drawing Sheets

(51) Int. Cl.
*A61B 10/02* (2006.01)
*G01N 35/04* (2006.01)
*G01N 35/10* (2006.01)

(52) U.S. Cl.
CPC .............. *G01N 2035/0434* (2013.01); *G01N 2035/1039* (2013.01)

(56) References Cited

U.S. PATENT DOCUMENTS 10,525,375 B2 * 1/2020 Nelson .................... B01D 15/14
11,590,433 B2 * 2/2023 Nelson .................... B01D 15/02

OTHER PUBLICATIONS

Lendor S., et al., "Solid Phase Microextraction-Based Miniaturized Probe and Protocol for Extraction of Neurotransmitters from Brains in Vivo," Analytical Chemistry, 2019, vol. 91, pp. 4896-4905.

Musteata et al., "Biocompatible Solid-Phase Microextraction Coatings Based on Polyacrylonitrile and Solid-Phase Extraction Phases," Analytical Chemistry, Sep. 2007, vol. 79 (18), pp. 6903-6911.

Nazmul Alam Md et al., "Effect of Binding Components in Complex Sample Matrices on Recovery in Direct Immersion Solid-Phase Microextraction: Friends or Foe?," Analytical Chemistry, 2018, vol. 90, pp. 2430-2433.

Poole et al., "Deposition of a Sorbent into a Recession on a Solid Support To Provide a New, Mechanically Robust Solid-Phase Microextraction Device," Analytical Chemistry, May 2017, vol. 89(15), pp. 8021-8026.XP055626924.

Watson C J., et al., "In Vivo Measurements of Neurotransmitters by Microdialysis Sampling," American Chemical Society, 2006, vol. 78(5), pp. 1391-1399.

Zhang Z., et al., "Sampling Volatile Organic Compounds using a Modified Solid Phase Microextraction Device," Journal of High Resolution Chromatography, 1996, vol. 19, pp. 155-160.

* cited by examiner

METHOD AND INSTRUMENT FOR EXTRACTING A COMPONENT FROM A SAMPLE

CROSS REFERENCE TO RELATED APPLICATION

This application claims the benefit of U.S. Provisional Patent Application No. 63/314,998, filed Feb. 28, 2022, which is incorporated by reference herein in its entirety.

FIELD

This specification relates to a method and instrument for solid phase microextraction for extracting a component of interest from a sample.

BACKGROUND

The following paragraphs are not an admission that anything discussed in them is prior art or part of the knowledge of persons skilled in the art.

Solid phase microextraction (SPME) is an approach for sample preparation that may be used in various analytical methods. SPME devices include an extraction coating present on a support, which may have different geometries. The extraction coating includes adsorptive particles. Exposure of the SPME device directly into a matrix or into its headspace, for a certain period of time, extracts and enriches analytes contained in the sample matrix.

The SPME process is governed by the partitioning of analytes from the matrix onto or into the extraction phase, and extraction efficiency of an analyte depends on the analyte's affinity toward the adsorptive particles present in the extraction coating.

After extraction and enrichment of the analytes onto or into the extraction phase, the SPME device may be placed in an analytical device where the analytes are desorbed and analyzed.

INTRODUCTION

The following introduction is intended to introduce the reader to this specification but not to define any invention. One or more inventions may reside in a combination or sub-combination of the apparatus elements or method steps described below or in other parts of this document. The inventors do not waive or disclaim their rights to any invention or inventions disclosed in this specification merely by not describing such other invention or inventions in the claims.

Surgical biopsy of the soft tissue is currently considered the standard procedure commonly performed to obtain diagnostic information, such as therapeutic drug monitoring, biomarker screening and metabolic profiling. To reduce the area of the infection-prone sampling site and the extend of trauma from tissue biopsy, techniques such as fine-needle aspiration biopsy can be used instead of core biopsy. Such techniques typically employ a 23-25 gauge (0.52-0.64 mm) needle which is inserted into the location of interest and a small portion of the tissue is extracted which can then be used for a standard histological study or biochemical tests. Metabolomics and biomarker discovery are relatively new approach to diagnostics based on tissue biopsy. Significant differences detected with physiological importance can then be used to distinguish between healthy and afflicted tissue. The differences in metabolic expression of the tissue biopsy are often detected by a high-resolution magnetic resonance or mass spectrometry following a liquid extraction of the tissue sample.

Determining the concentration of exogenous therapeutic drugs and endogenous compounds such as neurotransmitters in vivo is a powerful way to investigate the pharmacokinetics, pharmacology, and body function. Techniques such as microdialysis sampling (MD), magnetic resonance imaging (MRI), positron emission tomography (PET), and push-pull have been used for this purpose. Among them, MD, push-pull and in vivo SPME allow multiple components measurement with high selectivity and sensitivity when coupled with mass spectrometry (MS)-based techniques like liquid chromatography (LC)-MS, capillary electrophoresis (CE)-MS or direct to MS analysis.

MD and push-pull techniques infuse liquid solution, such as phosphate buffered saline (PBS) or artificial cerebrospinal fluid, to extract the compounds in the tissue and then withdraw the solution with extracted compounds. The withdrawn solution can be analyzed by MS. The major difference between MD and push-pull is that MD uses a microdialysis membrane to separate the solution and tissue matrix. Only compounds that can be transported by the connecting tubing and pass through the membrane are subjected for further analysis. However, one problem associated with MD and push-pull is that they can only extract compounds existing in large amount in a free form (polar analytes) which are not bonded to the tissue. For compounds which have strong bonding effect to the tissue matrix (such as non-polar compounds), the free concentration is low, which restricts the sensitivity of these two techniques. In addition, for MD, the non-polar compounds could be adsorbed on the tubing and membrane during the sampling process, that decreases the sensitivity and negatively influences the quantitative analysis.

The present disclosure provides a micro-syringe which may, in some examples, solve or avoid one or more problems associated with one or more known techniques used to determine the in vivo concentration of an analyte.

In one aspect, the present disclosure provides a micro-syringe for inserting into a sample matrix. The micro-syringe includes a micro-syringe body comprising an orifice at an insertion end; and a plunger at least partially coated with a solid-phase micro-extraction (SPME) coating. The plunger is longitudinally movable between an internal position and an extended position. When the syringe is inserted into the sample matrix, the extraction phase is shielded from the sample matrix by the micro-syringe body when the plunger is in the internal position, and at least a portion of the extraction phase extends past the orifice and is exposed to the sample matrix when the plunger is in the extended position. The plunger is sized to fit the internal diameter of the micro-syringe body to draw a liquid into the micro-syringe body when the plunger is moved from the extended position to the internal position.

The SPME coating may include hydrophilic-lipophilic balance (HLB) microparticles in a polyacrylontrile (PAN) binder. The HLB microparticles may include a poly(divinylbenzene-co-N-vinylpyrrolidone) copolymer. The poly (divinylbenzene-co-N-vinylpyrrolidone) copolymer may be a polymeric reaction product of N-vinylpyrrolidone (NVP) and divinylbenzene (DVP), preferably in a molar ratio from about 1:4 to about 1:2 (NVP:DVP), such as a molar ratio of about 1:3.

In another aspect, the present disclosure provides a method of obtaining a liquid and an adsorbed analyte from a sample matrix. The method uses a micro-syringe that includes a micro-syringe body comprising an orifice at the insertion end; and a plunger at least partially coated with a solid-phase micro-extraction (SPME) coating. The plunger is shielded from the sample matrix by the micro-syringe body. The method includes inserting the micro-syringe into the sample matrix; extending the plunger so that at least a portion of the extraction phase extends past the orifice; allowing the SMPE coating to adsorb an analyte from the sample matrix; drawing the plunger into the micro-syringe body to withdraw liquid from the sample matrix into the micro-syringe body; and removing the micro-syringe from the sample matrix.

In some examples, the SPME coating comprises particles which do not require solvent activation. In these examples, the method may include sterilizing the micro-syringe before the micro-syringe is inserted into the sample matrix without exposing the SMPE coating to a solvent after the sterilization and before the micro-syringe is inserted into the sample matrix.

In some examples, the method includes drawing a volume of an injectable, biocompatible, extraction fluid into the micro-syringe body before inserting the micro-syringe into the sample-matrix; and injecting the fluid into the sample matrix after the micro-syringe is inserted into the sample matrix.

The withdrawn liquid from the sample matrix, and the analyte adsorbed by the SPME coating may be analyzed by injecting the withdrawn liquid into a first volume of desorption solution; extending the plunger so that at least a portion of the SPME coating with the adsorbed analyte extends past the orifice; desorbing at least some of the analyte from the SPME coating into a second volume of the desorption solution; and analyzing at least some of the first and second desorption solutions, such as using liquid chromatography coupled with tandem mass spectrometry (LC-MS/MS) or microfluidic open interface coupled with tandem mass spectrometry (MOI-MS/MS).

In yet another aspect, the present disclosure provides a method that includes etching a length of an acupuncture needle, without etching an insertion end of the needle, to create a recessed portion that has a depth from about 5 μm to about 25 μm. The method includes applying a mixture of solid-phase micro-extraction (SPME) particles in a binder to the recessed portion to produce a coating of SPME particles whose maximum thickness is less than the depth of the recessed portion.

BRIEF DESCRIPTION OF THE DRAWINGS

Embodiments of the present disclosure will now be described, by way of example only, with reference to the attached Figures.

DETAILED DESCRIPTION

Figure 1:
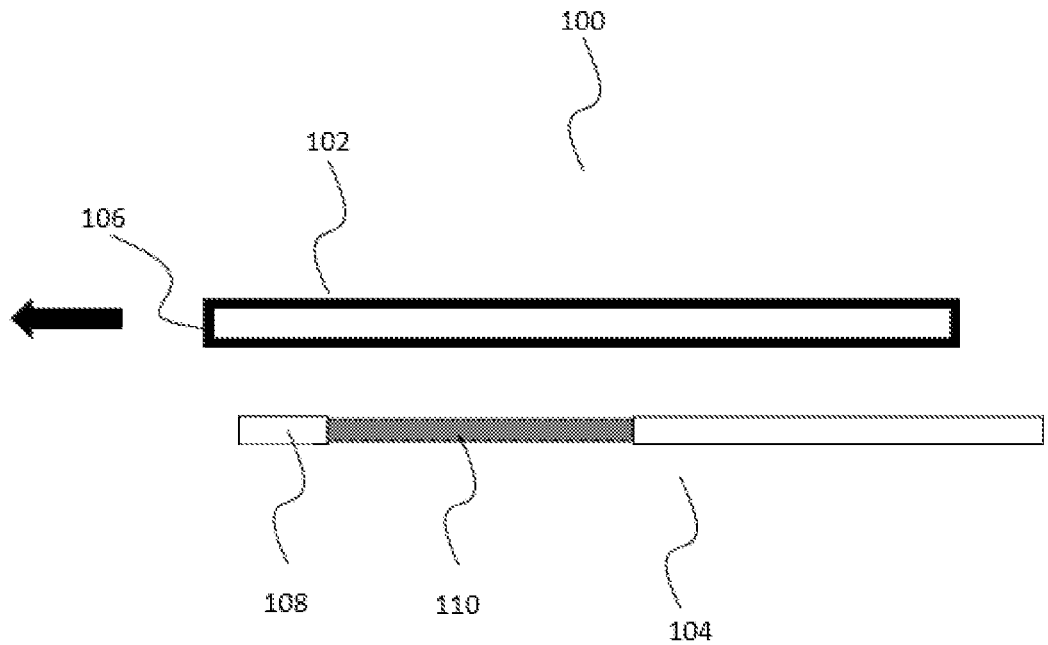
FIG. 1 is an illustration of the cross-section of a micro-syringe body and plunger according to the present disclosure. The micro-syringe body is illustrated as separate from the plunger.

Solid phase microextraction (SPME) is a technique that combines sampling, sample clean-up, metabolism quenching, and sample concentration into one streamlined process. Given the wide range of chemical sorbents that can be applied onto the SPME device, in vivo SPME doubles as a tool for untargeted metabolomics and biomarker discovery. A biocompatible polyacrylonitrile (PAN) binder may be used to avoid the extraction uptake of macro-molecules and microorganisms to achieve metabolism quenching and prevent biofouling. Additionally, metabolomics via in vivo SPME is also possible due to the balanced recovery of analytes across a wide range of log P values with a short sampling time prior to extraction equilibrium.

SPME with a fiber geometry can be used for both targeted and untargeted analyses in vivo. One advantage of in vivo SPME is the minimally invasiveness during sampling. SPME fibers with an outer diameter (OD) no more than 250 μm may be implemented in live animal and clinical studies in vivo. For example, a stainless steel based SPME tip with a hydrophilic-lipophilic balance (HLB) sorbent coupled to a supporting sheath may be used to extract targeted neurotransmitters from live macaque brains. Nitinol based SPME fibers coated with a C8-sulfonate mixed-mode (MM) extraction phase may be used for in vivo chemotherapeutic drug monitoring during lung perfusion with doxorubicin (DOX).

In one aspect, the present disclosure provides a micro-syringe for inserting into a sample matrix. The micro-syringe includes a micro-syringe body comprising an orifice at an insertion end; and a plunger at least partially coated with a solid-phase micro-extraction (SPME) coating. The plunger is longitudinally movable between an internal position and an extended position. When the syringe is inserted into the sample matrix, the extraction phase is shielded from the sample matrix by the micro-syringe body when the plunger is in the internal position, and at least a portion of the extraction phase extends past the orifice and is exposed to the sample matrix when the plunger is in the extended position. The plunger is sized to fit the internal diameter of the micro-syringe body to draw a liquid into the micro-syringe body when the plunger is moved from the extended position to the internal position. Preferably, all of the extraction phase that coats the plunger extends past the orifice and is exposed to the sample matrix when the plunger is in the extended position.

In some examples, a front end of the plunger defines an insertion side and a trailing side, and the plunger further includes a recessed portion located past the trailing side. In such examples, the recessed portion of the plunger is at least partially coated with the solid-phase micro-extraction (SPME) coating. In some examples, the front end of the plunger is sized to fit the internal diameter of the micro-syringe body to draw the liquid into the micro-syringe body. In some examples, the portion of the plunger located past the recessed portion of the plunger is sized to fit the internal diameter of the micro-syringe body to draw the liquid into the micro-syringe body.

In the context of the present disclosure, it should be understood that the expression "front end", is to be assessed based on the intended direction that the micro-syringe, probe or plunger is inserted into a sample matrix. The first part of the micro-syringe, probe or plunger that is inserted into the sample matrix should be considered the "front" end of the micro-syringe, probe or plunger. In some examples of a plunger according to the present disclosure, the front end includes the portion of the plunger that touches the sidewall of the micro-syringe body.

In the context of the present disclosure, it should be understood that the expressions "insertion side" and "trailing side" are relative to each other, are in relation to a feature, and are to be assessed based on the intended direction that the micro-syringe, probe or plunger is inserted into a sample matrix. For example, in a plunger that includes a front end, the plunger is intended to be inserted into the sample matrix and the side of the front end that is inserted first is the "insertion side" of the front end, and the side of the front end that is inserted after is the "trailing side" of the front end.

The depth of the recessed portion of the plunger may be from about 5 µm to about 25 µm, such as about 15 µm. In the context of the present disclosure, the depth of a recessed portion of a plunger is measured using the radius of the portion of the plunger that fits the internal diameter of the micro-syringe body, and the average radius of the recessed portion. For example, a needle having a front end with an outer diameter of 250 µm and a recessed portion having an average outer diameter of 220 µm should be understood to have a recessed portion that is 15 µm in depth. An acupuncture needle is one example of a needle that may be used as the basis for forming a plunger according to the present disclosure.

The extraction phase may have a maximum thickness that is less than the depth of the recessed portion, preferably wherein the thickness of the extraction phase is from about 5 µm to about 25 µm, such as a thickness of about 12.5 µm.

The plunger, the micro-syringe body, and the orifice may define a headspace when the plunger is in the internal position, preferably wherein the volume of the headspace is from about 2 µL to about 5 µL.

The plunger may include a pointed tip or a blunt tip; the plunger may be stainless steel, such as surgical grade stainless steel; the inner diameter of the micro-syringe body may be from about 200 µm to 300 µm; the extraction phase may coat about 10 mm of the length of the plunger; the recessed portion may be about 1.5 mm from the end the plunger closest to the orifice; or any combination thereof.

A plunger having a pointed tip and the SPME coating in a recessed portion of the plunger was subjected to repeated puncturing tests (5 times) in various animal organs and gas tight septa. The coating was checked before and after. The tissues used for the puncturing tests were bovine shoulder muscle, chicken liver, duck gizzard, bovine heart, and ovine lung. Bovine heart and duck gizzards are very tough organ tissues, while ovine lungs are soft but resilient to puncture due to the pleura.

Pointed tips enabled the ease of insertion compared to the conventional blunt-end SPME fibers, and the recessed portion protected the SPME coating material from being substantially damaged by the tissue during the puncture. A plunger having a blunt tip may reduce or eliminate damage of the tissue caused by the tip, allowing chemical biopsy of undisturbed portion of the tissue.

A plunger that is coated with the extraction phase starting from the front end of the plunger may be desirable in applications where limiting the depth of insertion into the sample is beneficial, for example when sampling an analyte from brain tissue. In such a situation, it may be desirable to use a plunger that lacks a recessed portion since such a plunger would require, for example, insertion of only 10 mm of the plunger to expose 10 mm of the extraction phase to the sample. In contrast, an otherwise identical plunger with a recessed portion would require insertion of both the length of the uncoated portion plus the 10 mm of the extraction phase.

SPME microparticles that may be used in extraction coatings according to the present disclosure preferably have a sufficient hydrophilic character that an autoclaved micro-syringe can be inserted into an in vivo sample matrix, such as an organ, tissue or body fluid, without the extraction coating having been wetted by a solvent.

One example of an SPME coating according to the present disclosure is an SPME coating that includes hydrophilic-lipophilic balance (HLB) microparticles in a polyacrylontrile (PAN) binder. The HLB microparticles may include a poly(divinylbenzene-co-N-vinylpyrrolidone) copolymer. The poly(divinylbenzene-co-N-vinylpyrrolidone) copolymer may be a polymeric reaction product of N-vinylpyrrolidone (NVP) and divinylbenzene (DVP), preferably in a molar ratio from about 1:4 to about 1:2 (NVP: DVP), such as a molar ratio of about 1:3. The microparticles may have, in a dried form, an average diameter of less than 20 µm, for example an average diameter of less than 10 µm, such as from about 1 µm to about 10 µm, for example from about 3 µm to about 5 µm. In a specific example, the microparticles may have, in a dried form, an average diameter of about 4 µm.

HLB microparticles as disclosed herein may be suitable for low- to high-polarity compounds for the purpose of targeted analyte monitoring or untargeted metabolomics with-out the need for prior solvent activation.

Extraction coatings according to the present disclosure may include a mixture of different SPME particles, where the different particles preferentially adsorb analytes with different chemical characteristics. For example, some SPME particles may preferentially adsorb analytes that are more polar than other of the SPME particles.

In another aspect, the present disclosure provides method to obtain a liquid and an adsorbed analyte from a sample matrix. In the method, a micro-syringe is inserted into the sample matrix. The micro-syringe includes a micro-syringe body that includes an orifice at the insertion end; and a plunger at least partially coated with a solid-phase microextraction (SPME) coating. The plunger is shielded from the sample matrix by the micro-syringe body when the micro-syringe is inserted into the sample matrix.

Once the micro-syringe is inserted into the sample matrix, the plunger is extended so that at least a portion of the extraction phase extends past the orifice. The SPME coating is allowed to extract an analyte from the sample matrix via adsorption, and the plunger is then drawn into the micro-syringe body to withdraw liquid from the sample matrix into the micro-syringe body. The micro-syringe is removed from the sample matrix.

The withdrawn liquid may be drawn into a headspace defined by the plunger, the micro-syringe body, and the orifice. The volume of the withdrawn liquid may be from about 2 µL to about 5 µL.

In some examples, the method also includes sterilizing the micro-syringe before the micro-syringe is inserted into the sample matrix, where the SPME coating is not exposed to a solvent after the sterilization and before the micro-syringe is inserted into the sample matrix.

The method may also include drawing a volume of an injectable, biocompatible, extraction fluid, such a phosphate buffered saline solution, into the micro-syringe body before inserting the micro-syringe into the sample matrix; and injecting the fluid into the sample matrix after the micro-syringe is inserted into the sample matrix. The withdrawn liquid may include a mixture of the injectable fluid and liquid from the sample. matrix. Injecting a fluid into the sample matrix and withdrawing liquid into the syringe body may be referred to as a "push-pull method".

The injectable fluid may be drawn into a headspace defined by the plunger, the micro-syringe body, and the orifice. The volume of the injectable fluid may be from about 2 µL to about 5 µL.

Once the micro-syringe is removed from the sample matrix, the method may also include desorption and analysis steps, for example including: injecting the withdrawn liquid into a first volume of desorption solution; extending the plunger so that at least a portion of the SPME coating with the adsorbed analyte extends past the orifice; desorbing at least some of the analyte from the SPME coating into a second volume of the desorption solution; and analyzing at least some of the first and second desorption solutions, such as using liquid chromatography coupled with tandem mass spectrometry (LC-MS/MS) or microfluidic open interface coupled with tandem mass spectrometry (MOI-MS/MS).

In another aspect, the present disclosure provides a method of making a plunger for a micro-syringe. The method includes etching a length of an acupuncture needle, without etching an insertion end of the needle, to create a recessed portion that has a depth from about 5 µm to about 25 µm, such as about 15 µm; and applying a mixture of solid-phase micro-extraction (SPME) particles in a binder, such as a polyacrylonitrile (PAN) binder, to the recessed portion to produce a coating of SPME particles whose maximum thickness is less than the depth of the recessed portion.

The depth of the recessed portion may be about 15 µm, the thickness of the extraction phase may be about 12.5 µm, and the SPME particles may have, in a dried form, an average diameter of about 1 µm to about 10 µm, for example about 3 µm to about 5 µm, such as about 4 µm.

As noted above, in some examples according to the present disclosure, the SPME particles have a sufficient hydrophilic character that an autoclaved micro-syringe can be inserted into an in vivo sample matrix, such as an organ, tissue or body fluid, without the extraction coating having been wetted by a solvent. Such SPME particles may be referred to as wettable particles.

One example of wettable HLB particles include particles made using DVB and NVP in a molar ratio of about 1:7 to about 1:1, such as about a 1:5, and from about 0.5 wt % to about 3 wt %, such as about 1 wt % (wt. % of total monomers), of AIBN as an initiator. Using DVB and NVP in a molar ratio of about 1:5 results in a polymeric reaction product with a molar ratio of the DVB to NVP reaction products at about 3:1. Precipitation polymerization in a mixture of ethanol as a solvent and toluene as a porogen (about 82.5 vol % ethanol and about 17.5 vol % of toluene), effected by heating at about 75° C. for about 22 hours under constant propeller stirring at about 120 rpm, may provide particles having an average diameter from about 3 µm to about 5 µm. Changing the reagent to reaction volume ratio, changing the ratio of ethanol to toluene, changing the mixing speed, changing the reaction time, and/or changing the reaction temperature may be used to change one or more physical properties of the resulting polymer (such the average size of the particles or the molar ratio of the DVB to NVP) and/or change one or more of the properties of the mixture of polymeric particles (such as the size distribution of the particles). In various examples, the reagent to reaction volume ratio is from about 5:100 v/v to about 15:100 v/v, the mixing speed is from 75 to 200 rpm, the reaction temperature is from 70° C. to 85° C., the reaction time is from about 12 to 24 hours, and the ethanol:toluene ratio is about 80:20 to 85:15 (v/v). The reaction may take place in an inert Teflon reaction vessel to reduce the chance that the growing polymers would adhere to the surface of the reaction vessel. A precipitation polymerization reaction according to the present application is a polymerization method that does not use a surfactant in the reaction mixture. The produced particles may be washed with ethanol, and collected via centrifugation. The washing and collecting may be repeated as necessary to remove substantially all residual reagents. The particles may be dried at an elevated temperature, such as a temperature of about 85° C., under nitrogen-purged vacuum, such as for about 8 hours. The produced particles may be referred to herein as "wettable HLB" (wHLB) particles.

Other HLB particles were prepared using a mixture of DVB, NVP and a third hydrophilic monomer to increase the proportion of polar functional group. The third hydrophilic monomers were glycidyl methacrylate (which was then used to create a terminal hydroxyl groups in basic epoxide ring opening); allyl glycidyl ether (which was then used to create terminal hydroxyl groups in basic epoxide ring opening); hydroxyethyl methacrylate; and methacrylic acid. However, the tri-monomer synthesis provided particles that were not suitably wettable and/or that had at least one physical characteristic that made them unsuitable for in vivo SPME. For example, some particles produced using the tri-monomer synthesis exhibited non-spherical polymeric aggregation while other particles exhibited non-wettable products.

Other HLB particles were prepared using a mixture of DVB and NVP in a suspension polymerization method, which is a polymerization method that uses a surfactant in the reaction mixture at high mixing speeds, such as at speeds of about 600-2200 rpm. (Hydroxypropyl)methylcellulose (HPMC) is one example of a surfactant that may be used in a suspension polymerization method. Suspension polymerization is disclosed in U.S. Pat. No. 5,882,521, and particles made using this method yielded particles that were about 70 µm to about 120 µm in diameter. Increasing the concentration of surfactant, increasing the stirring speed, increasing the initiator concentration, and decreasing the starting monomer concentration still resulted in particles that were larger than 20 µm in diameter and that had undesirably large particle size distributions.

In yet another aspect, the present disclosure provides an SPME probe. The probe includes a front end. The probe includes a recessed portion located past a trailing side of the front end. The recessed portion is at least partially coated with an SPME coating that includes wHLB particles, preferably in a PAN binder.

One specific example of a micro-syringe according to the present disclosure is illustrated in FIG. 1. A micro-syringe (100) is shown in an exploded view, with a micro-syringe body (102) separate from a plunger (104). The micro-syringe body (102) includes an orifice (106) at an insertion end. In FIG. 1, the insertion end is at the left side and the micro-syringe would be inserted into a sample in the direction of the arrow. The plunger (104) includes a front end (108). The plunger includes a recessed portion located past a trailing side of the front end. The recessed portion is coated with an SPME coating (110). The front end (108) is sized to fit the internal diameter of the micro-syringe body (102). The front end (108) and/or the portion of the plunger past the coated recessed portion (110) may be sized to fit the internal diameter of the micro-syringe body (102) to draw the liquid into the micro-syringe body.

Figure 2:
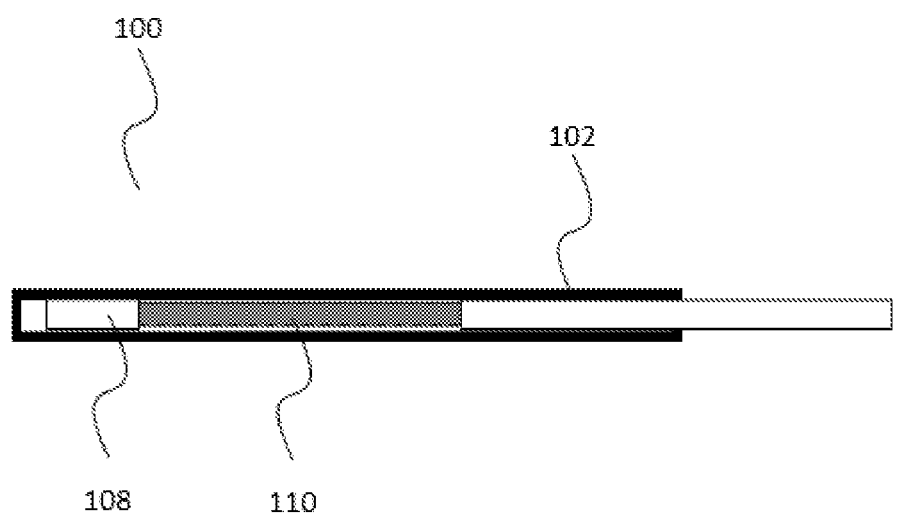
FIG. 2 is an illustration of the cross-section of a micro-syringe according to the present disclosure. The illustration shows the plunger in an internal position.

FIG. 2 illustrates a cross section of the micro-syringe (100) with the plunger (104) disposed within the micro-syringe body (102) in an internal position. When the plunger (104) is in the internal position, the SMPE coating (110) is shielded from the sample matrix when the syringe is inserted into the matrix.

Figure 3:
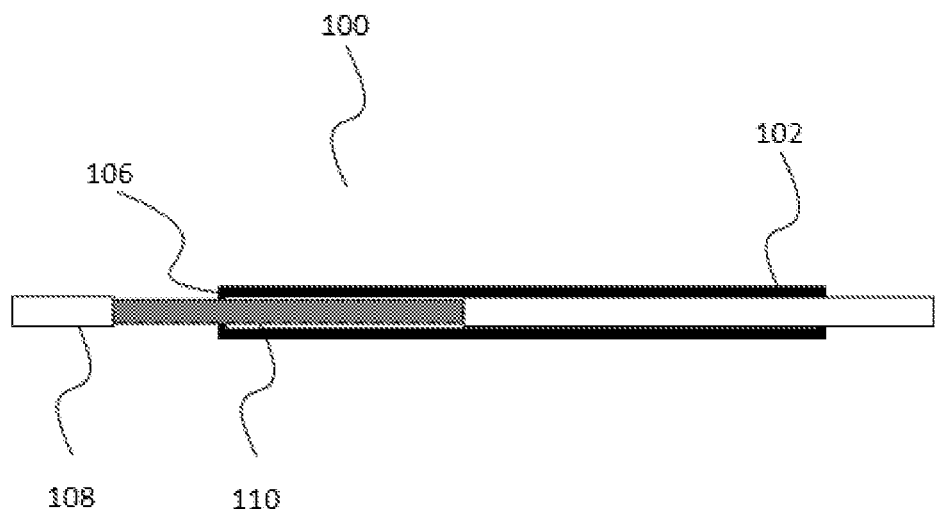
FIG. 3 is an illustration of the cross-section of the micro-syringe of FIG. 2. The illustration shows the plunger in an extended position.

FIG. 3 illustrates a cross section of the micro-syringe (100) with the plunger (104) disposed within the micro-syringe body (102) in an extended position. When the plunger is in the extended position, at least a portion of the SPME coating (110) extends past the orifice and is exposed to the sample matrix.

The plunger (104) is longitudinally movable between the internal position illustrated in FIG. 2 and the extended position illustrated in FIG. 3.

Figure 4:
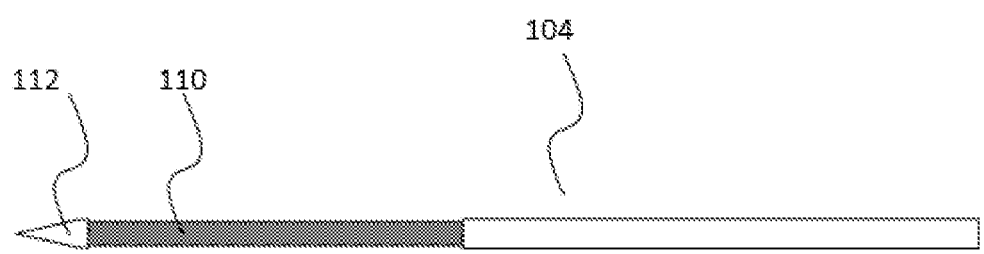
FIG. 4 is an illustration of a plunger or probe according to the present disclosure.

Although the front end (108) of the plunger (104) is illustrated as having a blunt tip, the tip may alternatively be pointed. FIG. 4 illustrates a plunger (104) with a pointed front end (112). The pointed front end (112) has a pointed tip on the insertion side of the front end, and the SPME coating (110) is coated on the recessed portion at the trialing side of the front end. The plunger (104) may be used as an SPME probe without the micro-syringe body.

Although the micro-syringe body (102) is illustrated in FIGS. 1 to 4 as having a blunt tip, the micro-syringe body (102) may alternatively include a pointed tip to aid in insertion of the micro-syringe into the sample matrix.

A micro-syringe according to the present disclosure, such as a micro-syringe illustrated in FIGS. 1 to 4, may be made by etching a portion of a stainless steel needle with acid. Etching a portion of the needle creates a portion of the needle whose diameter is less than the diameter of the un-etched portion of the needle. The etched portion is, thus, recessed in comparison to the un-etched portion of the needle. Alternatively, a micro-syringe according to the present disclosure, such as a micro-syringe illustrated in FIGS. 1 to 4, may be made by other methods of removing a portion of the substrate. Exemplary methods include mechanically grinding and laser etching a portion of a stainless steel needle.

Figure 5:
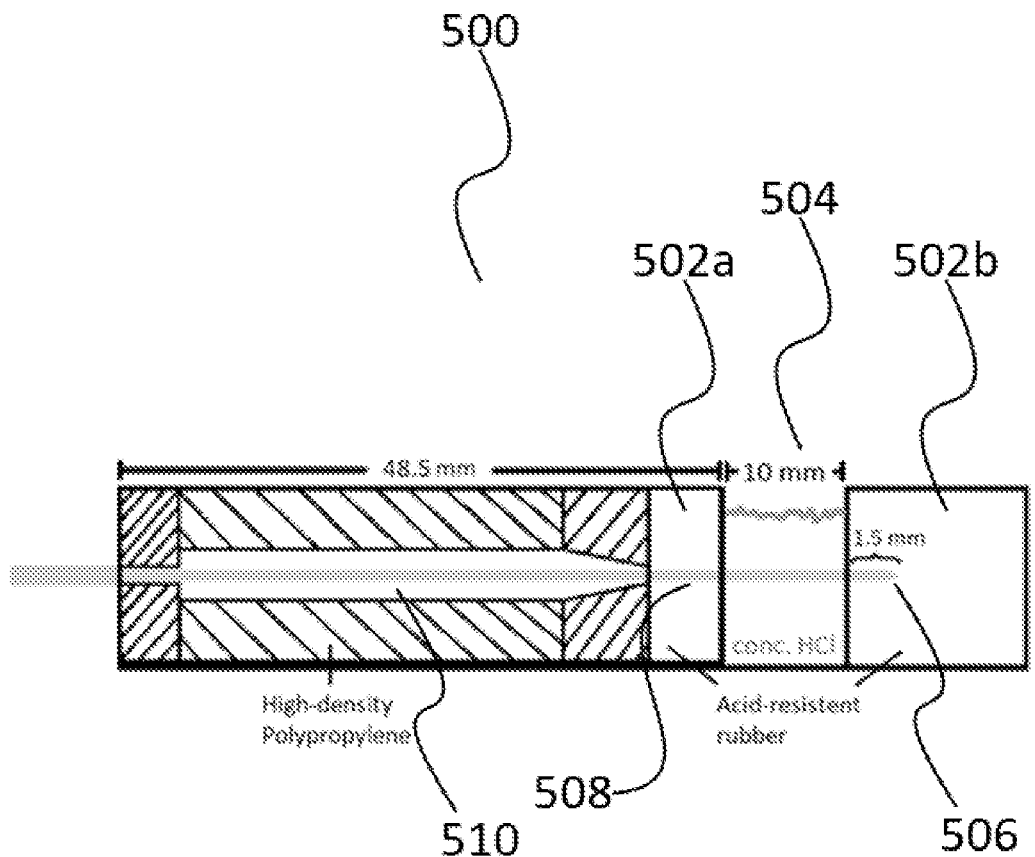
FIG. 5 is an illustration of the cross-section of an etching station according to the present disclosure.

FIG. 5 is a cross-sectional diagram of an etching station (500), which may be used to make a plunger that can be used in a micro-syringe according to the present disclosure. The etching station (500) includes protective portions (502a, 502b) defining an etching channel (504) that holds an etching solution, such as concentrated hydrochloric acid. The protective portions (502a, 502b) prevent the etching solution from contacting a front end (506) and a back end (508) of a needle (510). The portion of the needle etched by the etching solution in the etching channel (504) results in a portion that is recessed in comparison to the un-etched portions covered by the protecting portions (502a, 502b). In some examples, the un-etched portions of the needle may protected by a polymer, such as a polymer used in an eraser, for example a butyl rubber eraser or a vinyl rubber eraser.

An etching station, such as the etching station illustrated in FIG. 5, may allow the plunger to be prepared with specific dimensions. For example, a needle may be inserted so that about 1.5 mm of the tip is inserted into the protective portion (502b), and the etching channel (504) may be sized to produce a recessed portion that is about 10 mm in length. The needle may be subjected to the etching solution for a length of time sufficient to remove about 5 µm to about 25 µm of depth of material from the outside of the needle body.

Figure 6:
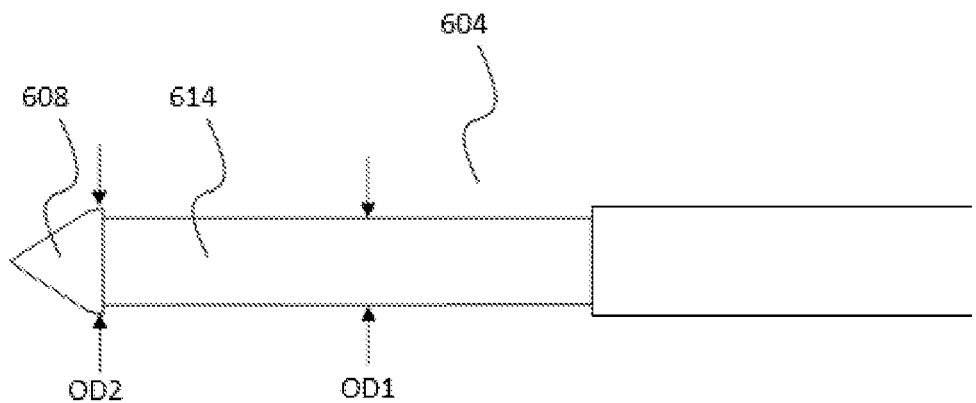
FIG. 6 is an illustration of the cross-section of a needle which can act as an uncoated plunger in a micro-syringe according to the present disclosure, or as a substrate in an SPME probe according to the present disclosure.

FIG. 6 is an illustration of an enlarged cross-section of a needle (604) which can act as an uncoated plunger in a micro-syringe according to the present disclosure. The needle (604) has front end (608) and a recessed portion (614). The recessed portion is located past a trailing side of the front end (608). The needle (604) is enlarged to more clearly show the recessed portion (614) as having a diameter (illustrated as OD1) that is smaller than the diameter of the front end (illustrated as OD2). The diameter of the front end (OD2) is sized to fit the inner diameter of a micro-syringe body so that the needle can act as a plunger.

In FIG. 6, the recessed portion (614) is illustrated as uncoated. When at least part of the recessed portion (614) is coated with an SPME extraction coating, the resulting needle may be used as a plunger in a micro-syringe according to the present disclosure.

In other aspects, when at least part of the recessed portion (614) is coated with an SPME extraction coating, such as an SPME coating that includes wHLB particles preferably in a PAN binder, the resulting needle may be used as an SPME probe unprotected by a micro-syringe body.

Figure 7:
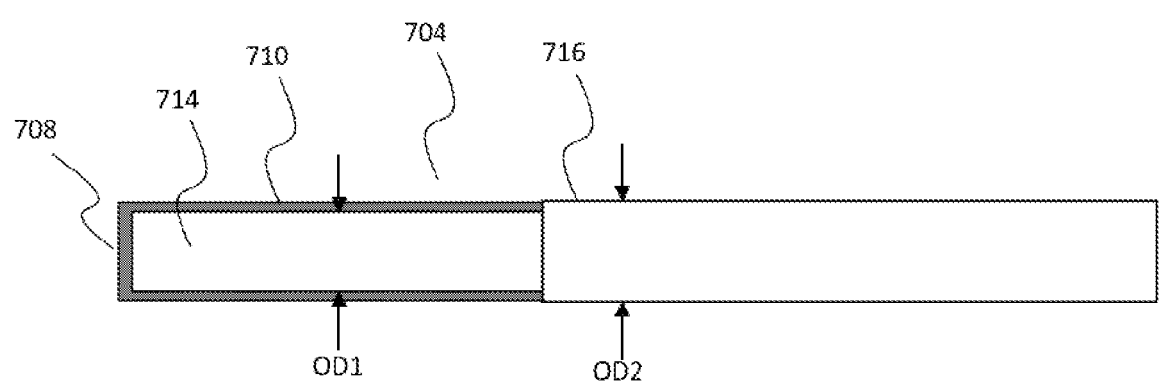
FIG. 7 is an illustration of a plunger or probe according to the present disclosure.

FIG. 7 is an illustration of an enlarged cross-section of a plunger according to the present disclosure. FIG. 7 illustrates a plunger (704) with an SPME coating (710) that is coated on a recessed portion (714). The SPME coating (710) covers the plunger starting from the front end (708). The plunger (704) may be used as an SPME probe without a micro-syringe body. When the plunger (704) is used with a micro-syringe body, the un-recessed portion (716) past the SPME coating may be sized to fit the internal diameter of the micro-syringe body to draw the liquid into the micro-syringe body.

In the illustrated plunger, the plunger (704) is enlarged to more clearly show the recessed portion (714) as having a diameter (illustrated as OD1) that is smaller than the diameter of the rest of the plunger (illustrated as OD2).

EXAMPLES

Reagents. Seirin Laser SL2530 Stainless steel acupuncture needles, 30 mm×0.25 mm and 60 mm×0.25 mm, were purchased from Eastern Currents (Vancouver, BC, Canada). Common drugs of abuse (DOA) standards: Atenolol, morphine, lorazepam, codeine, oxazepam, cocaine, carbamazepine, nordiazepam, diazepam, propranolol, and buprenorphine were purchased from Cerilliant Corporation (Round Rock, TX, USA). Acetonitrile (ACS grade), toluene (ACS grade), divinylbenzene (DVB), N-vinylpyrrolidone (NVP), 2,2'-Azobis(2-methylprop-ionitrile) (AIBN), polyacryloni-trile (PAN) (181315), dimethylformamide (DMF), and phosphate buffered saline (P4417) were purchased from MilliporeSigma (Oakville, ON, Canada). Formic acid (FA), hydrochloric acid (HCl), sodium hydroxide, LC-MS grade methanol (MeOH), acetonitrile (ACN), 2-propanol (IPA) and water were purchased from Fischer Scientific (Mississauga, ON, Canada). C8-SCX mixed mode fibers were kindly provided by Supelco (Milwaukee, PA, USA). Doxorubicin (DOX) was purchased from Toronto Research Chemicals (Toronto, ON, Canada). Human plasma and blood (pooled gender) were purchased from BioIVT (Westbury, NY, USA). Fresh ovine lungs were purchased from a local butcher shop (Waterloo, ON, Canada).

Etching. An etching device having a plurality of etching stations as illustrated in FIG. 5 was manufactured by precision machining using high-density polypropylene (HDPP), Teflon™ poly ether ketone (PEEK) and acid-resistant rubber (white vinyl). Teflon™ and PEEK were made into inserts used as needle guides (using center drills) inside each etching station/spot. Needles were inserted into the plurality of etching stations and underwent acid etching using approximately 75 mL of HCl (37% w/w) for 30 to 40 minutes at room temperature (20 to 25° C.) to achieve a recession that was about 15 μm in depth (250 μm diameter before the etching to 220 μm diameter after etching). After removing the etchant, the etched needles were then briefly rinsed by water, soaked in MeOH, sonicated in water bath for 15 minutes, and dried by $N_2$ prior to dip-coating.

Synthesis of 3-5 μm hydrophilic-lipophilic balance particles (HLB). In a 500 mL 3-necked round bottom flask, 165 mL of acetonitrile and 35 mL toluene were added. The flask was sealed by rubber caps with an inlet constantly purging with $N_2$ gas to remove oxygen and water and a hypodermic needle to avoid pressure buildup. A mechanical stir propeller was installed and kept constantly stirring at 100 rpm. After two hours, 4 mL of divinylbenzene crosslinking monomer and 1 mL of N-vinylpyrrolidone (NVP) monomer, and 300 mg of 2,2'-azobis(2-methylpropionitrile) free radical initiator were added to the flask. The flask containing the reaction mixture was then heated in a silicone oil bath to 70° C. to thermally induce the precipitation polymerization reaction for 24 hours.

The reaction mixture containing the HLB particles were briefly sonicated to ensure everything was suspended in the solvents. The particles were then collected by centrifugation at 10,000 g for 15 minutes, resuspended in 50 mL of ethanol (>99%) to eliminate leftover reagents. The particles were washed and collected in this manner 3 times before oven-drying at 120° C. for 24 hours under $N_2$-purged vacuum. The resulting HLB particles may be referred to as "regular HLB" particles.

Synthesis of hydrophilic surface HLB particles (HS-HLB). Hydrophilic surface-HLB (HS-HLB) particles were synthesized similarly to HLB particles with an additional co-polymer, glycidyl methacrylate, at 1.25 mL. After washing and collecting the particles, they were subjected to an additional epoxide ring opening step using 50 mL of 2M NaOH in 150 mL of EtOH at 60° C. for 48 hours under constant stirring. The HS-HLB particles were then cleaned by 50 mL ultrapure water first, followed by 50 mL of 1:1 ethanol/$H_2O$, and lastly by ethanol. The particles were collected by centrifugation at 10,000 g for 15 minutes from each step. Finally, the HS-HLB particles were air-dried over-night, then further oven-dried at 80° C. under $N_2$-purged vacuum overnight.

Synthesis of about 4 μm wettable-HLB (wHLB) particles. In a 200-mL Teflon (PTFE) cylindrical reaction vessel, 82.5 mL EtOH was used as the solvent, and 17.5 mL of toluene was used as the porogen. 2 mL of DVB crosslinker, 6 mL of NVP hydrophilic functional monomer, 90 mg of AIBN initiator were added to the mixture and purged under $N_2$ for 30 min while mixed with a magnetic stir bar at 120 rpm. The reaction mixture was then heated and kept at 75° C. for 22 hours. The particles were washed multiple times with EtOH and collected via centrifugation. The wHLB particles were dried at 85° C. under $N_2$-purged vacuum overnight.

Elemental analysis of wHLB particles and HLB particles shows that the HLB particles have 89.1±0.3% C and 0.92±0.3% N; while the wHLB particles have 84.7±0.2% C and 2.59±0.1% N. The elemental analysis of the particles shows an increase in % N for the wHLB particles, which is expected since the mole ratios of n-vinylpyrrolidone (NVP) to Divinylbenzene (DVB) went from 1:4 in the synthesis of regular HLB particles to 5:1 for the wHLB particles. Compared to the HLB particles, there is a nearly 3-fold molar increase in % N composition for the wHLB particles, which translates to nearly 3 times more NVP content in the wHLB particle compared to the HLB particle.

Scanning Electron Microscopy (SEM) imaging showed that the size of the dried particles was from about 3.5 μm to about 4.5 μm in diameter, with an average diameter of around 4 μm. Dynamic Light Scattering (DLS) showed a Gaussian distribution of around 5 μm for the wHLB particles suspended in water, suggesting that the particles exhibited about 20% swelling when fully hydrated.

Coating slurry preparation: Polyacrylonitrile (PAN) binder was made by adding 5 g PAN to approximately 70 mL dimethylformamide (DMF) in a glass jar with a lid. After a brief mixing, the jar was heated to 90° C. for one hour with periodic brief-degassing and mixing every 15 minutes until all of the PAN was dissolved. This binder solution could be used for a few months.

All slurries containing various chemical sorbents (C8-sulphonate mixed mode ("MM"), HLB, HS-HLB) were made with the following composition in a 10 mL glass vial: with a small (1-cm) magnetic stir bar, 0.65 g of sorbent particles were added, 6.2 g of the PAN binder was added, and 0.2 g of glycerol was added. The vial was capped and mixed on a benchtop mixer for 10 minutes. The slurries were left on magnetic stir plates for a few days before using.

Coating. The chemical sorbent was deposited into the recession by dip-coating with a curing temperature of 80° C. for 30 seconds. The coating on the tip of each needle was later removed by sanding the coating off the tip.

Clean-up. The resulting needles are then submerged in a cleaning solution containing 3:3:3:1 ACN/MeOH/IPA/$H_2O$ under agitation on a benchtop vortexer at 500 rpm for 30 minutes. The process was repeated twice.

Sterilization. A standard medical sterilization procedure was implemented where fibers were subjected to steam sterilization in an autoclave at 121° C. for 45 minutes. The autoclaved SPME needles were then dried by $N_2$ and stored in glass vial until use.

Preconditioning. Activating the sorbent after sterilization may be performed using a preconditioning solution containing high organic content, such as a 70% ethanol solution. As illustrated by the results shown in Table 1, activating the sorbent facilitates SPME devices using MM or HLB particles to extract an analyte present in an aqueous-based sample. However, as illustrated by the results shown in Tables 1 and 2, both activated and un-activated wHLB particles showed similar extraction efficiencies.

Matrix-matched biological model. Ovine lungs were used as the model tissue sample. Ovine lungs were homogenized using a blender with just enough dry ice to prevent heating of the tissue sample. Final tissue homogenates were prepared and partitioned in a ratio of 1.5 mL of PBS (pH 7.4) to 13.5 g of blended tissue. The target analytes (DOA standards) and DOX standards were spiked into each glass vial of tissue homogenate according to the protocol adapted from Roszkowska et al. (Journal of Pharmaceutical Analysis Volume 11, Issue 1, February 2021, Pages 37-47).

Unless otherwise specified, the extraction parameters were as follows: 5-second water wash to remove surface organic solvent (when applicable), 20-minute static mode extraction for tissue homogenate or 20-minute extraction with agitation (1000 rpm with benchtop vortexer) for biofluids, samples were kept at room temperature, 5-second water wash post-extraction to remove matrix particulates on the needles, 30-minute desorption with agitation (1000 rpm benchtop vortexer) in 300 µL of 7:2:1 MeOH/ACN/H2O+ 0.1% v/v FA.

LC-MS/MS analysis. Thermo Vanquish UHPLC coupled to Thermo TSQ Quantiva triple quadrupole mass spectrometer via heated ESI (HESI) (Thermo Scientific, San Jose, CA, USA) was used for this study. Phenomenex PFP (2.1 mm×10 mm, 1.7 µm) column was employed for LC separation. Mobile phase A consisted of water (0.1% FA), mobile phase B was ACN (0.1% FA), and flow rate was kept at 0.3 mL/min. After 5 minutes of 10% B for column equilibration, the gradient increased to 95% B linearly over 7 minutes. It was kept at 95% B for 5 minutes before quickly dropping back down to 10% B in 0.3 minutes.

Microfluidic open interface (MOI)-MS. A MOI interface (Pawliszyn, Waterloo, Canada) was adapted from the disclosures in Looby et al. (Analyst, 2019, vol. 144, pp. 3721-3728) and WO2017193213A1. The MOI interface was coupled to a generic syringe pump and Shimadzu 8060 triple quadrupole mass spectrometer via HESI ion source. The desorption took place inside the MOI chamber immediately after the 5-second water rinse post-extraction for a 10-second static mode desorption in 10 µL of 7:2:1 MeOH/ACN/H2O+0.1% v/v FA. The mass spectrometer was then turned on to scan for compound-specific transitions continuously for multiple rounds of MOI desorption and injections. The MOI-MS system was calibrated before use by injecting about 5 µL of DOA standard into the MOI chamber.

Performance of wHLB particles. The performance of wHLB, regular HLB and C8-sulfonate was tested with and without activation in ethanol/water (70:30, v/v) by measuring the extraction efficiency of 11 common drugs of abuse (DOA) as well as doxorubicin (DOX) over a wide range of Log P values (0.2~4.5) from human plasma.

The performance of wHLB particles, with and without activation in 70% ethanol, was also tested in blood and homogenized ovine lung tissue samples.

Chemotherapeutic drug monitoring of doxorubicin (DOX) in tissue. One of the notable clinical applications using SPME probes is the chemotherapeutic drug monitoring of DOX via in vivo SPME. In order to quantitatively determine the amount of DOX extracted by in vivo SPME, matrix-matched calibration using a model tissue sample, such as ovine lung homogenate, can be utilized.

A matrix-matched calibration curve was made using homogenized ovine lung tissue which spiked with the DOX in advance. After extraction using an SPME coating of wHLB particles on an SPME probe according to the present disclosure, i.e. an SPME probe without a micro-needle body to form a micro-syringe according to the present disclosure, the device was desorbed with desorption solution and then analyzed by LC-MS.

The matrix-matched SPME calibration method was also coupled with microfluidic open interface (MOI), which is a direct to MS technique. Using MOI-MS, the detection and quantification of tissue DOX concentration can be achieved within minutes.

Push-pull sampling. A micro-syringe according to FIGS. 1 to 3, optionally using a plunger as illustrated in FIG. 4, was used in a push-pull sampling method. The micro-syringe included a recessed SPME acupuncture needle as described above and stainless-steel microtubing as the body of the syringe. The microtubing was 4.8 cm in length with about a 254 µm ID and about a 457 µm OD. The inside diameter of the microtubing closely matches the outside diameter of the front end of the acupuncture needle. The SPME coating included wHLB particles as disclosed above.

Prior to sampling, a small volume of about 3 to 4 µL of an injectable liquid solution (PBS or artificial cerebrospinal fluid) was drawn into the tubing by drawing the acupuncture needle backwards. The tubing was inserted into the sample matrix. After reaching the area of interest, the extraction solution inside the micro-syringe was pushed into the sample matrix by moving the acupuncture needle from the internal position to the extended position, thereby exposing the SPME coating to the sample matrix. In the exemplary method, the sample matrices that were tested included PBS and agarose gel.

After an extraction time, for example a time sufficient to allow an analyte in the tissue to reach equilibrium with adsorbed analyte on the SPME coating, the recessed SPME acupuncture needle was withdrawn back into the sheath tubing, and at the same time drawing into the micro-syringe a small volume of about 3 to 4 µL of a mixture of the original injectable liquid and water from the sample matrix. The withdrawn liquid may be referred to as the "aspirated solution". The micro-syringe was removed from the sample matrix.

The volume of collected solution inside the micro-syringe body was dispensed into a small vial and the SPME acupuncture needle was desorbed as described above. Finally, the aspirated solution and the desorption solution were analyzed by MS-based methods either separately or together.

In one experiment, a push-pull method was used to extract polar and non-polar compounds simultaneously. Two different sample matrices were tested separately: (a) an aqueous sample (water), and (b) an agar gel sample (in lieu of biological tissue). Sixteen compounds, including 5 neurotransmitters and 11 drugs of abuse (DOA), with log P varying from −4.2 to 4.5 were spiked into the samples.

The concentration of acetylcholine, choline, γ-aminobutyric acid, dopamine and serotonin were 200 ng/mL and the concentration of the 11 DOAs were 10 ng/mL. The extraction time was 20 min.

One water sample and one gel sample were extracted statically, and another water sample was extracted with benchtop vortex agitation at 1000 rpm. After extraction, 3 to 4 µL of the aspirated solution was diluted with 47 µL of ACN/MeOH/water 7/2/1 (v/v/v) with 0.1% formic acid. The SPME coating was desorbed with 100 µL of ACN/MeOH/water 7/2/1 (v/v/v) with 0.1% formic acid. The above solutions were analyzed by LC-MS.

Results.

Table 1 illustrates the difference in extraction efficiency of 11 common drugs of abuse (DOA) from human plasma with two common chemical sorbents used for SPME in LCMS applications-hydrophilic-lipophilic balance (HLB) and C8-sulphonate mixed mode (MM) (Supelco Canada Ltd., ON, CA) as well as wHLB particles according to the present disclosure. When autoclaved (deactivated), HLB performed drastically poorer in terms of extraction efficiency for all compounds across a wide range of log P values than when it was activated. And to a lesser extent, MM also suffered from reduced extraction efficiency when autoclaved instead of activated, though this was only true for the more polar analytes.

TABLE 1

Extraction efficiencies of various analytes (in nanogram) from human plasma (10 µg/L).

| | MM | | HLB | | wHLB | |
|---|---|---|---|---|---|---|
| | Autoclaved (ng) | Activated (ng) | Autoclaved (ng) | Activated (ng) | Autoclaved (ng) | Activated (ng) |
| Atenolol | 0.039* | 0.185* | 0.033* | 0.091* | 0.133 | 0.123 |
| Morphine | 0.032* | 0.148* | 0.018* | 0.079* | 0.166 | 0.160 |
| Codeine | 0.120 | 0.142 | 0.037* | 0.092* | 0.190 | 0.178 |
| Oxacepam | 0.011* | 0.035* | 0.006* | 0.011* | 0.052 | 0.042 |
| Cocaine | 0.068 | 0.076 | 0.032* | 0.075* | 0.082 | 0.078 |
| Carbamazepine | 0.078* | 0.138* | 0.029* | 0.066* | 0.146 | 0.128 |
| Diazepam | 0.020* | 0.037* | 0.005* | 0.009* | 0.039 | 0.032 |
| Nordiazepam | 0.019* | 0.038* | 0.006* | 0.011* | 0.047 | 0.039 |
| Propranolol | 0.100 | 0.096 | 0.044* | 0.077* | 0.109 | 0.098 |
| Fentanyl | 0.068 | 0.063 | 0.018* | 0.043* | 0.066 | 0.061 |
| Buprenorphine | 0.017* | 0.025* | 0.002* | 0.006* | 0.026 | 0.024 |

*Values that differ by more than 30% between autoclaved and activated for a given chemical sorbent with a given analyte.
Relative standard deviation (RSD %) was <30% for all values reported for regular HLB and MM (<20% for most values).
RSD % was <20% for all values reported for wHLB (<10% for most values).
N = 4 for each data point.

Table 2 illustrates the extraction efficiency of drugs of abuse (DOA) by wHLB with and without solvent activation in blood and homogenized ovine lung tissue samples.

TABLE 2

Extraction efficiencies of various analytes (in nanogram) from blood (20 µg/L) and homogenized tissue (50 µg/kg) using wHLB particles.

| | Blood | | Homogenized tissue | |
|---|---|---|---|---|
| | Autoclaved (ng) | Activated (ng) | Autoclaved (ng) | Activated (ng) |
| Atenolol | 0.184 | 0.197 | 0.261 | 0.301 |
| Morphine | 0.189 | 0.223 | 0.264 | 0.308 |
| Codeine | 0.286 | 0.298 | 0.364 | 0.398 |
| Oxacepam | 0.089 | 0.070 | 0.097 | 0.104 |
| Cocaine | 0.093 | 0.087 | 0.177 | 0.181 |
| Carbamazepine | 0.282 | 0.280 | 0.233 | 0.235 |
| Diazepam | 0.075 | 0.056 | 0.121 | 0.123 |
| Nordiazepam | 0.097 | 0.076 | 0.083 | 0.087 |
| Propranolol | 0.151 | 0.137 | 0.075 | 0.077 |
| Fentanyl | 0.326 | 0.302 | 0.229 | 0.223 |
| Buprenorphine | 0.105 | 0.088 | 0.082 | 0.080 |

No value differed by more than 15% between autoclaved and activated devices for any given analyte.
Relative standard deviation (RSD %) was <20% for all values reported (<10% for most values).
N = 4 for each point.

The results illustrated in Tables 1 and 2 demonstrated that the extraction efficiency of wHLB does not change in more complex matrices, such as human blood and homogenized ovine lung tissue, with and without activation. The results illustrated in Table 1 show that extraction efficiency of regular HLB suffered without solvent activation, and the extraction efficiency of C8-sulfonate particles also decreased for most of the compounds.

Table 3 illustrates the quantitative determination of the amount of DOX extracted by in vivo SPME from ovine lung homogenate. The results illustrated in Table 5 demonstrated that the wHLB particles exhibited good linear dynamic range from 1 to 500 mg/kg, with the low limit of detection, LOD (signal to noise ratio 3) of 0.3 mg/kg and low limit of quantitation, LOQ (signal to noise ratio 10) of 1 mg/kg. The linear calibration resulted in a fit with an $R^2$ value of 0.9987.

TABLE 3

Quantitative determination of the amount of DOX extracted by in vivo SPME from ovine lung homogenate.

| DOX concentration in tissue sample (mg/kg) | Amount of DOX extracted (ng) |
|---|---|
| 0 | 0.019 |
| 5 | 0.388 |
| 10 | 0.639 |
| 25 | 1.351 |
| 50 | 2.627 |
| 100 | 5.403 |
| 125 | 6.509 |
| 300 | 17.381 |
| 500 | 27.369 |

% RSD <20% for all data points.
N = 4 for each point.

Table 4 illustrates the matrix-matched calibration for DOX from ovine lung homogenate using SPME coupled to MOI-MS. The results illustrated in Table 6 show a wide linear dynamic range from about 5 mg/kg (LOQ) to about 500 mg/kg (limit of tissue saturation). The linear calibration resulted in a fit with an $R^2$ value of 0.994. The LOD of this method is approximately 1 mg/kg tissue DOX concentration.

TABLE 4

Matrix-matched calibration for DOX from ovine lung homogenate using SPME coupled to MOI-MS.

| DOX concentration in tissue sample (mg/kg) | Instrument response (peak area) |
|---|---|
| 10 | 43646 |
| 25 | 75111 |
| 50 | 162429 |
| 100 | 342754 |
| 125 | 460853 |
| 300 | 1195007 |
| 500 | 1773247 |

% RSD <25% for all values N = 4 for each point.

Table 5 illustrates the performance of a push-pull method using a micro-syringe according to the present disclosure on the extraction of polar and non-polar analytes from different matrices.

TABLE 5

Performance of a push-pull method using a micro-syringe according to the present disclosure (nanograms of analyte extracted)

|  | Water sample with agitation | | Water sample without agitation | | Agar gel matrix | |
| --- | --- | --- | --- | --- | --- | --- |
|  | Aspirated solution (ng) | SPME coating (ng) | Aspirated solution (ng) | SPME coating (ng) | Aspirated solution (ng) | SPME coating (ng) |
| Choline | 0.8033 | 0.0265 | 1.0526 | 0.0320 | 0.2821 | 0.0000 |
| γ-Aminobutyric acid | 1.3285 | 0.0000 | 1.7535 | 0.0000 | 0.4008 | 0.0000 |
| Acetylcholine | 0.7840 | 0.2399 | 0.9260 | 0.2589 | 0.3002 | 0.1179 |
| Dopamine | 0.3659 | 1.7079 | 0.6024 | 1.5272 | 0.1345 | 0.5885 |
| Serotonin | 0.6933 | 10.7474 | 1.1280 | 5.5133 | 0.3415 | 2.8200 |
| Atenolol | 0.0074 | 0.6047 | 0.0040 | 0.1917 | 0.0201 | 0.6745 |
| Morphine | 0.0076 | 0.4866 | 0.0044 | 0.1938 | 0.0227 | 0.7130 |
| Codeine | 0.0100 | 2.0760 | 0.0081 | 0.2500 | 0.0284 | 0.8355 |
| Oxacepam | 0.0030 | 3.5979 | 0.0051 | 0.2449 | 0.0268 | 0.8477 |
| Cocaine | 0.0066 | 1.7123 | 0.0073 | 0.2663 | 0.0299 | 0.9262 |
| Carbamazepine | 0.0030 | 2.5797 | 0.0055 | 0.2577 | 0.0300 | 0.9161 |
| Diazepam | 0.0058 | 1.8389 | 0.0059 | 0.2594 | 0.0283 | 0.9277 |
| Nordiazepam | 0.0048 | 2.6221 | 0.0071 | 0.2887 | 0.0299 | 0.9818 |
| Propranolol | 0.0001 | 4.3395 | 0.0015 | 0.2701 | 0.0170 | 0.8918 |
| Fentanyl | 0.0002 | 4.7455 | 0.0019 | 0.2598 | 0.0215 | 0.8641 |
| Buprenorphine | 0.0028 | 4.4125 | 0.0019 | 0.2500 | 0.0270 | 0.8624 |

As illustrated by the data in Table 5, for all the three extraction conditions, the aspirated solution contained higher amounts of analytes of log P lower than −1 (polar analytes) compared to the amount contained by the SPME coating. This was expected since the SPME microparticles used in this experiment have low extraction efficiency on highly polar analytes. The SPME coating extracted substantially higher amounts of analytes with log P larger than −1. This is because of the high enrichment effect of SPME. The results illustrated by Table 7 demonstrated that by using this push-pull solid-phase microextraction micro syringe device, both polar and non-polar analytes can be extracted simultaneously. In addition when agitation is applied during extraction, SPME can extract larger amount of more hydrophobic analytes compared to static extraction. This is because there are faster extraction kinetics when using agitation during the sampling since the extraction is pre-equilibrium for more hydrophobic analytes.

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings. Further aspects and embodiments are found in the following numbered paragraphs.

1. A micro-syringe for inserting into a sample matrix, the micro-syringe comprising: a micro-syringe body comprising an orifice at an insertion end; and a plunger at least partially coated with a solid-phase micro-extraction (SPME) coating; wherein the plunger is longitudinally movable between an internal position and an extended position; wherein, when the syringe is inserted into the sample matrix: the extraction phase is shielded from the sample matrix by the micro-syringe body when the plunger is in the internal position, and at least a portion of the extraction phase extends past the orifice and is exposed to the sample matrix when the plunger is in the extended position; and wherein the plunger is sized to fit the internal diameter of the micro-syringe body to draw a liquid into the micro-syringe body when the plunger is moved from the extended position to the internal position.

2. The micro-syringe according to paragraph 1, wherein a front end of the plunger defines an insertion side and a trailing side, the plunger further comprising a recessed portion located past the trailing side, wherein the recessed portion of the plunger is at least partially coated with the solid-phase micro-extraction (SPME) coating.

3. The micro-syringe according to paragraph 2, wherein the depth of the recessed portion of the plunger is from about 5 μm to about 25 μm, such as about 15 μm.

4. The micro-syringe according to paragraph 2 or 3, wherein the extraction phase has a maximum thickness that is less than the depth of the recessed portion, preferably wherein the thickness of the extraction phase is from about 5 μm to about 25 μm, such as a thickness of about 12.5 μm.

5. The micro-syringe according to any one of paragraphs 1 to 4, wherein the plunger, the micro-syringe body, and the orifice define a headspace when the plunger is in the internal position, preferably wherein the volume of the headspace is from about 2 μL to about 5 μL.

6. The micro-syringe according to any one of paragraphs 1 to 5, wherein: the plunger comprises a pointed tip, or a blunt tip; the plunger is stainless steel, such as surgical grade stainless steel; the inner diameter of the micro-syringe body is from about 200 μm to 300 μm; the extraction phase coats about 10 mm of the length of the plunger; the recessed portion is about 1.5 mm from the end the plunger closest to the orifice; or any combination thereof.

7. The micro-syringe according to any one of paragraphs 1 to 6, wherein the SPME coating comprises hydrophilic-lipophilic balance (HLB) microparticles in a polyacrylontrile (PAN) binder.

8. The micro-syringe according to paragraph 7, wherein the HLB microparticles comprise a poly(divinylbenzene-co-N-vinylpyrrolidone) copolymer.

9. The micro-syringe according to paragraph 8, wherein the poly(divinylbenzene-co-N-vinylpyrrolidone) copolymer is a polymeric reaction product of N-vinylpyrrolidone (NVP) and divinylbenzene (DVP), preferably in a molar ratio from about 1:4 to about 1:2 (NVP: DVP), such as a molar ratio of about 1:3.

10. The micro-syringe according to any one of paragraphs 7 to 9, wherein the microparticles have, in a dried form, an average diameter of less than 20 μm, such as about 1 μm to about 10 μm, for example about 3 μm to about 5 μm.

11. A method of obtaining a liquid and an adsorbed analyte from a sample matrix, the method comprising: inserting a micro-syringe into the sample matrix, the micro-syringe comprising: a micro-syringe body comprising an orifice at the insertion end; and a plunger at least partially coated with a solid-phase micro-extraction (SPME) coating, wherein the plunger is shielded from the sample matrix by the micro-syringe body; extending the plunger so that at least a portion of the extraction phase extends past the orifice; allowing the SMPE coating to adsorb an analyte from the sample matrix; drawing the plunger into the micro-syringe body to withdraw liquid from the sample matrix into the micro-syringe body; and removing the micro-syringe from the sample matrix.

12. The method according to paragraph 11, further comprising: sterilizing the micro-syringe before the micro-syringe is inserted into the sample matrix, wherein the SPME coating is not exposed to a solvent after the sterilization and before the micro-syringe is inserted into the sample matrix.

13. The method according to paragraphs 11 or 12, further comprising: drawing a volume of an injectable fluid into the micro-syringe body before inserting the micro-syringe into the sample matrix; and injecting the fluid into the sample matrix after the micro-syringe is inserted into the sample matrix.

14. The method according to paragraph 13, wherein the withdrawn liquid comprises a mixture of the injectable fluid and liquid from the sample matrix.

15. The method according to any one of paragraphs 11 to 14, further comprising: injecting the withdrawn liquid into a first volume of desorption solution; extending the plunger so that at least a portion of the SPME coating with the adsorbed analyte extends past the orifice; desorbing at least some of the analyte from the SPME coating into a second volume of the desorption solution; and analyzing at least some of the first and second desorption solutions, such as using liquid chromatography coupled with tandem mass spectrometry (LC-MS/MS) or microfluidic open interface coupled with tandem mass spectrometry (MOI-MS/MS).

16. The method according to any one of paragraphs 11 to 15, wherein the micro-syringe is a micro-syringe according to any one of paragraphs 1 to 9.

17. A method comprising: etching a length of an acupuncture needle, without etching an insertion end of the needle, to create a recessed portion that has a depth from about 5 μm to about 25 μm, such as about 15 μm; and applying a mixture of solid-phase micro-extraction (SPME) particles in a binder, such as a polyacrylonitrile (PAN) binder, to the recessed portion to produce a coating of SPME particles whose maximum thickness is less than the depth of the recessed portion.

18. The method according to paragraph 17, wherein the depth of the recessed portion is about 15 μm, the thickness of the extraction phase is about 12.5 μm, and the SPME particles have, in a dried form, an average diameter of about 1 μm to about 10 μm, for example about 3 μm to about 5 μm.

19. The method according to paragraphs 18 or 19, wherein the SPME articles include hydrophilic-lipophilic balance (HLB) microparticles, such as HLB microparticles that comprise a poly(divinylbenzene-co-N-vinylpyrrolidone) copolymer, for example wherein the poly(divinylbenzene-co-N-vinylpyrrolidone) copolymer is a polymeric reaction product of N-vinylpyrrolidone (NVP) and divinylbenzene (DVP), preferably in a molar ratio from about 1:4 to about 1:2 (NVP:DVP), such as a molar ratio of about 1:3.

20. A solid-phase micro-extraction device comprising a support, and an extraction coating covering at least a portion of the support, wherein the extraction coating comprises a polymeric binder and poly(divinylbenzene-co-N-vinylpyrrolidone) copolymer microparticles, wherein the microparticles are a polymeric reaction product of N-vinylpyrrolidone (NVP) and divinylbenzene (DVP) and the NVP and DVP reaction products are in a molar ratio from about 1:4 to about 1:2 (NVP:DVP), such as a molar ratio of about 1:3.

Since the above description provides examples, it will be appreciated that modifications and variations can be effected to the particular examples by those of skill in the art. Accordingly, the scope of the claims should not be limited by the particular examples set forth herein, but should be construed in a manner consistent with the specification as a whole.

What is claimed is:

1. A micro-syringe for inserting into a sample matrix, the micro-syringe comprising:
    a micro-syringe body comprising an orifice at an insertion end; and
    a plunger at least partially coated with a solid-phase micro-extraction (SPME) coating;
    wherein the plunger is longitudinally movable between an internal position and an extended position;
    wherein, when the syringe is inserted into the sample matrix:
        the SPME coating is shielded from the sample matrix by the micro-syringe body when the plunger is in the internal position, and
        at least a portion of the SPME coating extends past the orifice and is exposed to the sample matrix when the plunger is in the extended position; and
    wherein the plunger is sized to fit the internal diameter of the micro-syringe body to draw a liquid into the micro-syringe body when the plunger is moved from the extended position to the internal position.

2. The micro-syringe according to claim 1,
    wherein a front end of the plunger defines an insertion side and a trailing side, the plunger further comprising a recessed portion located past the trailing side, wherein the recessed portion of the plunger is at least partially coated with the solid-phase micro-extraction (SPME) coating.

3. The micro-syringe according to claim 2, wherein the recessed portion of the plunger has a depth that is from about 5 μm to about 25 μm.

4. The micro-syringe according to claim 2, wherein the recessed portion of the plunger has a depth, and the SPME coating has a maximum thickness that is less than the depth of the recessed portion.

5. The micro-syringe according to claim 1, wherein the plunger, the micro-syringe body, and the orifice define a headspace when the plunger is in the internal position.

6. The micro-syringe according to claim 1, wherein:
the plunger comprises a pointed tip, or a blunt tip;
the plunger is stainless steel;
the inner diameter of the micro-syringe body is from about 200 µm to 300 µm;
the SPME coating coats about 10 mm of the length of the plunger;
the recessed portion is about 1.5 mm from the end the plunger closest to the orifice;
or any combination thereof.

7. The micro-syringe according to claim 1, wherein the SPME coating comprises hydrophilic-lipophilic balance (HLB) microparticles in a polyacrylontrile (PAN) binder.

8. The micro-syringe according to claim 7, wherein the HLB microparticles comprise a poly (divinylbenzene-co-N-vinylpyrrolidone) copolymer.

9. The micro-syringe according to claim 8, wherein the poly (divinylbenzene-co-N-vinylpyrrolidone) copolymer is a polymeric reaction product of N-vinylpyrrolidone (NVP) and divinylbenzene (DVP).

10. The micro-syringe according to claim 7, wherein the microparticles have, in a dried form, an average diameter of less than 20 µm.

11. A method of obtaining a liquid and an adsorbed analyte from a sample matrix, the method comprising:
inserting a micro-syringe into the sample matrix, the micro-syringe comprising:
a micro-syringe body comprising an orifice at an insertion end; and
a plunger at least partially coated with a solid-phase micro-extraction (SPME) coating,
wherein the plunger is shielded from the sample matrix by the micro-syringe body;
extending the plunger so that at least a portion of the SPME coating extends past the orifice;
allowing the SMPE coating to adsorb an analyte from the sample matrix;
drawing the plunger into the micro-syringe body to withdraw liquid from the sample matrix into the micro-syringe body; and
removing the micro-syringe from the sample matrix.

12. The method according to claim 11, further comprising:
sterilizing the micro-syringe before the micro-syringe is inserted into the sample matrix, wherein the SPME coating is not exposed to a solvent after the sterilization and before the micro-syringe is inserted into the sample matrix.

13. The method according to claim 11, further comprising:
drawing a volume of an injectable fluid into the micro-syringe body before inserting the micro-syringe into the sample matrix; and
injecting the fluid into the sample matrix after the micro-syringe is inserted into the sample matrix.

14. The method according to claim 13, wherein the withdrawn liquid comprises a mixture of the injectable fluid and liquid from the sample matrix.

15. The method according to claim 11, further comprising:
injecting the withdrawn liquid into a first volume of desorption solution;
extending the plunger so that at least a portion of the SPME coating with the adsorbed analyte extends past the orifice;
desorbing at least some of the analyte from the SPME coating into a second volume of the desorption solution; and
analyzing at least some of the first and second desorption solutions.

16. The method according to claim 11, wherein the micro-syringe is a micro-syringe according to claim 1.

17. A method comprising:
etching a length of an acupuncture needle, without etching an insertion end of the needle, to create a recessed portion that has a depth from about 5 µm to about 25 µm; and
applying a mixture of solid-phase micro-extraction (SPME) particles in a binder to the recessed portion to produce a coating of SPME particles whose maximum thickness is less than the depth of the recessed portion.

18. The method according to claim 17, wherein the depth of the recessed portion is about 15 µm, the thickness of the SPME coating is about 12.5 µm, and the SPME particles have, in a dried form, an average diameter of about 1 µm to about 10 µm.

19. The method according to claim 18, wherein the SPME articles include hydrophilic-lipophilic balance (HLB) microparticles.

20. A solid-phase micro-extraction device comprising:
a support, and
an extraction coating covering at least a portion of the support,
wherein the extraction coating comprises a polymeric binder and poly (divinylbenzene-co-N-vinylpyrrolidone) copolymer microparticles,
wherein the microparticles are a polymeric reaction product of N-vinylpyrrolidone (NVP) and divinylbenzene (DVP) and the NVP and DVP reaction products are in a molar ratio from about 1:4 to about 1:2 (NVP:DVP).

* * * * *